US 8,539,507 B2

(12) United States Patent
Aveyard et al.

(10) Patent No.: US 8,539,507 B2
(45) Date of Patent: Sep. 17, 2013

(54) SERVICE ORIENTED ARCHITECTURE

(75) Inventors: David Charles Aveyard, Edinburgh (GB); Joseph Gerard Phillips, Edinburgh (GB); Derek John Paton, Edinburgh (GB)

(73) Assignee: Standard Life Employee Services Limited, Edinburgh (GB)

( * ) Notice: Subject to any disclaimer, the term of this patent is extended or adjusted under 35 U.S.C. 154(b) by 1242 days.

(21) Appl. No.: 11/991,695

(22) PCT Filed: Sep. 7, 2006

(86) PCT No.: PCT/GB2006/003309
§ 371 (c)(1),
(2), (4) Date: Jul. 7, 2008

(87) PCT Pub. No.: WO2007/028994
PCT Pub. Date: Mar. 15, 2007

(65) Prior Publication Data
US 2009/0228898 A1  Sep. 10, 2009

(30) Foreign Application Priority Data
Sep. 9, 2005 (GB) .................................. 0518416.3

(51) Int. Cl.
*G06F 9/45* (2006.01)
(52) U.S. Cl.
USPC ........... 719/314; 719/315; 717/102; 717/103; 717/107
(58) Field of Classification Search
None
See application file for complete search history.

(56) References Cited

U.S. PATENT DOCUMENTS

| 2003/0225923 | A1* | 12/2003 | Cyr et al. ....................... 709/313 |
| 2004/0221005 | A1* | 11/2004 | Albaugh et al. ............... 709/203 |
| 2006/0015353 | A1* | 1/2006 | Reese .............................. 705/1 |
| 2006/0168122 | A1* | 7/2006 | Acharya et al. ............... 709/219 |
| 2006/0177069 | A1* | 8/2006 | Critchley et al. ............. 380/283 |
| 2007/0011126 | A1* | 1/2007 | Conner et al. .................. 706/47 |

OTHER PUBLICATIONS

BEA Aqualogic Service Bus, Jun. 2005, pp. 1-12.*
IBM Patterns: SOA with an Enterprise Service Bus, May 2005, pp. 1-410.*
Fjellehim, T., et al., "The 3DMA Middleware for Mobile Application", *Lecture Notes in Computer Science, Springer Verlag*, Berlin, DE, Aug. 2004, vol. 3207, pp. 312-323, XP002372247.
Horrell, S., "Microsoft Message Queue (MSMQ)", *Enterprise Middleware, Xephon Newbury*, US, Jun. 1999, pp. 20-31, XP001096346.

(Continued)

*Primary Examiner* — H S Sough
*Assistant Examiner* — Syed Roni
(74) *Attorney, Agent, or Firm* — Drinker Biddle & Reath LLP

(57) ABSTRACT

A computer system and method of using a service oriented architecture (SOA) which runs business service application in a distributed network. The system has a channel dependent client layer containing a presentation layer and an application control layer, a channel independent service layer containing a business service layer and a data service layer and an integration layer. The integration layer can receive requests for service from the client layer and has a message generator for sending a request message to the service layer which is adapted to read the request message and in response, to run the business service application.

32 Claims, 10 Drawing Sheets

(56) References Cited

OTHER PUBLICATIONS

Iona Technologies, PLC, "Using Artix and Service-Oriented Architecture for Multi-Channel Access", Internet Citation, Feb. 2004, XP002359281, http:/www.iona.com/devcenter/artix/articles/0304soa.pdf.>, Retrieved Nov. 8, 2005.

Naveen, Balani, "Model and Build ESB SOA Frameworks", Internet Citation, Mar. 15, 2005, XP002354390, http://www-128.ibm.com/developerworks/web/library/wa-soaesb/>. Retrieved Nov. 16, 2005.

Geppert, D., et al., "Event-Based Distributed Workflow Execution with EVE", Internet Citation, Mar. 1, 1996, XP002194570, http://citeseer.nj.nec.com/33730.html>, Retrieved on Mar. 27, 2002.

Ibarra, F., "The Enterprise Service Bus: Building Enterprise SOA", Internet Citation, Sep. 12, 2004, XP002354388, http://dev2dev.bea.com/lpt/a/389>, Retrieved on Nov. 16, 2005.

\* cited by examiner

Fig. 11

SERVICE ORIENTED ARCHITECTURE

The present invention relates to distributed networks and in particular, but not exclusively to improvements to systems management in distributed networks having a service oriented architecture (SOA).

BACKGROUND TO THE INVENTION

The term service oriented architecture is used in computing to express a software architectural concept that defines the provision and use of services to support the requirements of software users. In a SOA, discrete, independent services can be made available on a network which can be accessed by the developer to allow the developer to create software solutions through a combination of SOA services.

In other architectures, software solutions are designed to be application specific and the software system will be designed and implemented in order to fulfil a specific range of tasks for a client. For example, where an organisation has a number of separate businesses, each with specific computing requirements then each will develop a bespoke application to meet the requirements.

It is evident that in many organizations, the functionality contained on different applications may be the same or similar and there is a large amount of redundancy because this functionality exists on a number of applications. Furthermore, the design of applications and the way they handle data can be highly application specific and the data may be formatted in a specific way for the application.

The implementation of a SOA would in theory, avoid this redundancy because business services would be available to clients throughout the organisation. These services would not be application specific, but would be designed to be used by all clients.

Clearly, an SOA would be highly desirable because:
it would allow the rapid construction and adaptation of software business processes and so called composite applications;
the business service function would be delivered as autonomous services; and
the services would be independent of each other and any particular implementation strategy.

However, there are a number of problems associated with attempting to implement an SOA. The implementation of an SOA requires a high degree of standardisation across an organisation in order that services can be readily consumed. Therefore, organisations who are accustomed to having software designed to meet the needs of a specific application, will be required to change their approach. This requires the implementation of rules and procedures for designing SOA oriented software. In addition, in large organisations the scaling up of an SOA presents problems of tracking interactions and of collecting information on the manner in which services are used.

SUMMARY OF THE INVENTION

It is an object of the present invention to provide an improved system which implements a service oriented architecture (SOA).

The present invention provides a computer system for running one or more software application, the computer system having one or more nodes and containing one or more business service software applications which can be combined together to provide a business function and which are adapted to operate an SOA.

Preferably, the SOA provides a software framework to underpin the business service software applications and the business service software applications are reusable.

In accordance with a first aspect of the invention there is provided a computer system having a service oriented architecture and which is adapted to run at least one business service application, the computer system comprising:
one or more channel dependent client layer;
one or more channel independent service layer; and an integration layer comprising request receiving means for receiving a request for service message from the at least one client layer, a message router adapted to send the request for service message to the at least one service layer which is adapted to read the request message and in response, to run the business service application Preferably, the client layer comprises a presentation layer that is provided with processing means and logic for presenting information to end users.

Preferably, the presentation layer is specific to the application that is being built and to the channel or platform which has been chosen to deliver the application to end users.

Preferably, the client layer also comprises an application control layer.

Preferably, the service layer is provided with a business service layer.

Preferably, the service layer is provided with a data services layer.

Preferably, the application control layer acts as a controlling component for business services in the business services layer.

Preferably, the presentation layer is able to selectively invoke components of the application control layer by sending a request for data to the application control layer.

Preferably, the application control layer determines which business services are required to satisfy the request.

Preferably, the business services layer is adapted to provide generic business functions.

Preferably, the business services in the business service layer are designed to be reusable.

Optionally, the data services in the data services layer are designed to be reusable.

Preferably, a business service is made up of one or more data services.

Preferably, end-to-end processing of a request from the client layer is split across the client layer and the service layer.

Preferably, the integration layer maps a name of a service onto a name and version of the business service and routes the message onto a queue.

Preferably, the integration layer uses the business service name and version as a key to access a business service directory.

Preferably, the integration layer further comprises a message queue.

Preferably, the business service layer is adapted to read the request message from the message queue and in response, to run the business service application.

Preferably, the arrival of the request message in the message queue triggers a business service framework code which invokes the requested service.

Preferably, a reply message is produced by the business service layer and is sent to a reply message queue.

Preferably, the reply message queue to which the reply message is sent is specified in the request message.

Preferably, the integration layer reads the reply message.

Preferably, the integration layer returns the reply message to the application control layer.

Preferably, the application control Layer processes the business service reply and returns data ready to be rendered within the presentation layer.

Preferably, the request message generated by the message generator has a header that enables the routing of the message through the system.

Preferably, the message header enables user and system defined contextual information to flow through the system.

Preferably, the message header provides the message with a unique identifier that allows information about the message to flow across logic controls.

Preferably, the message has a session ID which provides information on the user session within which the message was executed.

Preferably, the message has a context chain identifier that allows the position of the message within a chain of messages to be identified.

Preferably, the message has a payload which contains request data.

Preferably, the request data comprises input parameters that may be passed to the business service.

Preferably, the system further comprises a system manager.

Preferably, the system manager comprises a logging mechanism for detecting events associated with system activity.

The logging mechanism provides the ability to log how components interact within the SOA e.g. Which applications are invoking which business services.

Preferably, the logging mechanism can emit multiple events per request message as the request message is flowing through the layers in the system.

Preferably the emission of events can be scaled up or scaled down dynamically such that the logging volumes that are generated can be changed.

Preferably the logging events are captured and held in a central database for subsequent querying.

Preferably, the logging mechanism is adapted to log the interaction between components of the system and the SOA. In this was it is possible to determine which applications invoke which business service. Preferably, the logging mechanism provides application performance monitoring.

Preferably, the logging mechanism provides volume/capacity monitoring.

Preferably, the logging mechanism provides information on absolute numbers and/or throughput trends and/or concurrency information.

Preferably, the logging mechanism is provided with an analysis tool for analysing logging data.

Preferably, the analysis tool has a graphical user interface that presents the logging data graphically.

Preferably, the logging mechanism is configurable so that different event types may be logged.

Preferably, the logging mechanism can gather application specific audit and management information.

In accordance with a second aspect of the present invention there is provided a method for operating a service oriented architecture, method comprising the steps of:
sending a request for service message to an integration layer from at least one client layer, routing the request for service message through the integration layer to at least one service layer which is adapted to read the request message and in response, to run a business service application.

Preferably, the client layer comprises a presentation layer that is provided with processing means and logic for presenting information to end users.

Preferably, the client layer comprises an application control layer.

Preferably, the service layer is provided with a business service layer.

Preferably, the service layer is provided with a data services layer.

Preferably, the application control layer controls business services in the business services layer.

Preferably, the application control layer determines which business services are required to satisfy the request for service.

Preferably, the presentation layer is able to selectively invoke components of the application control layer by sending a request for data to the application control layer.

Preferably, end-to-end processing of the request for service from the client layer is split across the client layer and the service layer.

48. A method as claimed in claims 39 to 47 wherein, the integration layer uses a business service name and version as a key to access a business service directory.

Preferably, the business service layer is adapted to read the request message from the message queue and in response, to run the business service application.

Preferably, the arrival of the request message in the message queue triggers a business service framework code which invokes the requested service.

Preferably, a reply message is produced by the business service layer and is sent to a reply message queue.

Preferably, the reply message queue to which the reply message is sent is specified in the request message.

Preferably, the application control layer processes the business service reply message and returns data ready to be rendered within the presentation layer.

Preferably, wherein the request message generated by the message generator has a header that enables the routing of the message through the system.

Preferably, the message header enables user and system defined contextual information to flow through the system.

Preferably, the message header provides the message with a unique identifier that allows information about the message to flow across logic controls.

Preferably, the message has a session ID which provides information on the user session within which the message was executed.

Preferably, the message has a context chain identifier that allows the position of the message within a chain of messages to be identified.

Preferably, the message has a payload which contains request data.

Preferably, the events associated with system activity are logged.

Preferably, one or more events per request message are emitted as the request message is flowing through the layers in the system.

Preferably, the emission of events can be scaled up or scaled down dynamically such that the logging volumes that are generated can be changed.

Preferably the logging events are captured and held in a central database for subsequent querying.

Preferably, the logging mechanism is configurable so that different event types may be logged.

Preferably, the logging mechanism gathers event types such as application specific audit and management information.

Preferably a graphical user interface presents the one or more different event type.

Preferably wherein at least one event type is displayed in a separate window from another event type.

Preferably event type data comprises the average number of concurrent requests within the system.

Preferably event type data comprises response time data.

BRIEF DESCRIPTION OF THE DRAWINGS

The invention will now be described by way of example only with reference to the accompanying drawings in which:

FIG. 11 shows a graphical user interface that provides component interaction information in accordance with the present invention.

DETAILED DESCRIPTION OF THE INVENTION

SOA applications are built on a common software framework and infrastructure resulting in a high degree of confidence in the consistency of code and run time capability. This approach avoids having a suite of applications that have significantly different characteristics.

The present invention provides a SOA in which channel dependent and channel independent services are linked by an integration layer. The integration layer identifies in detail the types of business services that are required by the channel dependent client layer and creates one or more messages that contain the necessary information that will allow the channel independent business services to provide these services. The creation and use of these messages can provide more effective management of the system when combined with a scaleable logging mechanism. An SOA designed in accordance with the present invention can allow end-to-end processing to be split across a number of layers.

Figure 1:
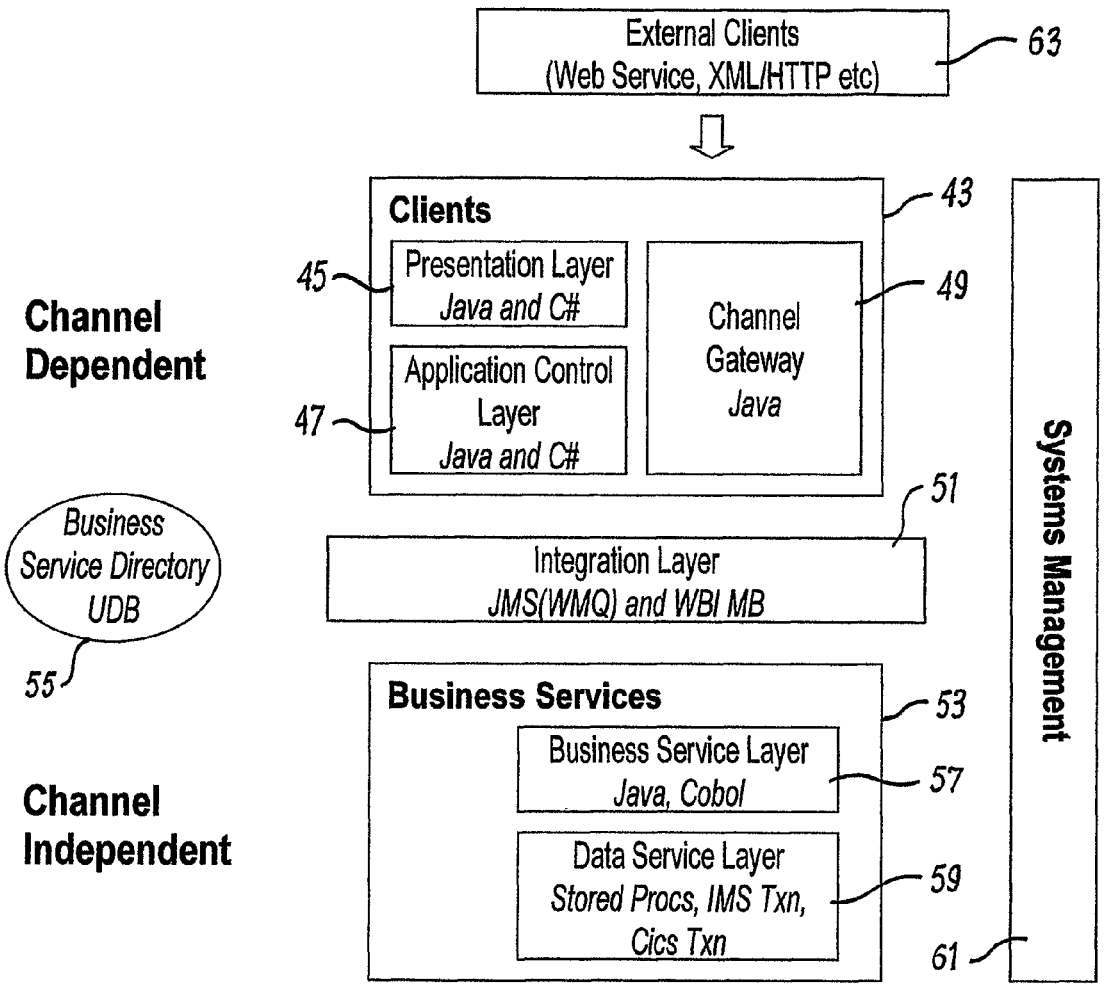
FIG. 1 is a schematic diagram showing the layers and implementation technologies used in accordance with the present invention.

FIG. 1 is a schematic representation of a SOA system in accordance with the present invention having Clients 43, an integration layer 51, channel independent business services 53, systems management 61 and external client 63 functions for clients that exist outside the SOA framework. A business services directory 55 is also shown.

The channel dependent client 43 contains a presentation layer 45, an application control layer 47 and a channel gateway 49. The integration layer 51 provides functionality to allow business services to be invoked by the client.

The business services functionality 53 contains a business services layer 57 and a data services layer 59.

The systems management layer 61 is used to manage the entire system by collecting information on various functions in the system and logging use of the business services.

Figure 2:
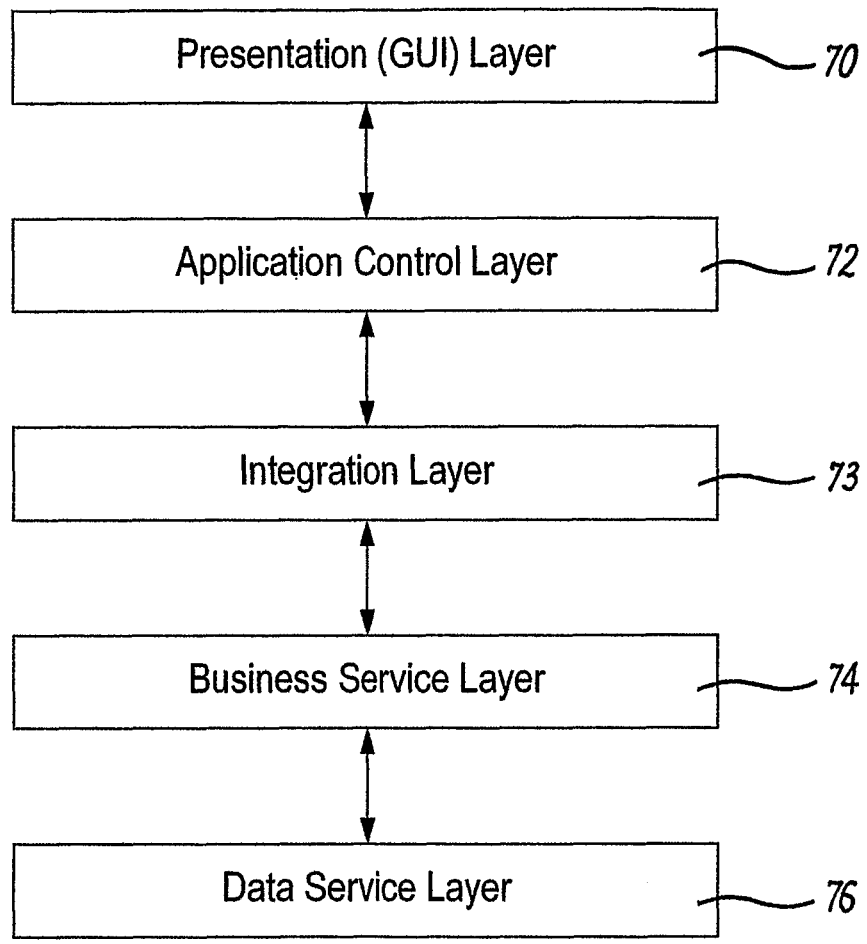
FIG. 2 is a block diagram showing the relationship between layers in an SOA in accordance with the present invention.

FIG. 2 is an alternative representation of the present invention in which the layered structure of the present invention is shown.

The presentation (GUI) layer 70 holds the processing and logic for presenting information to the end users, and is specific to the application that is being built and will therefore be specific to the channel (platform) which has been chosen to deliver the system to the users. Thus, the presentation layer 45 renders the information provided by the business service layer in a pre-determined manner suitable for display The application control layer (ACL) 72 is also specific to the application being built, as it acts as the controlling component for the application. The ACL is invoked by GUI components in the fashion appropriate for enabling the desired results of the application. This is also channel dependent.

The business service layer 74 is independent of the application. Therefore, whilst the original requirements for a business service function may have originated from an application, the requirement will have been enhanced to focus on a more generic business function, and be deployed in a manner that others can reuse without cross-platform issues. The present invention allows for reuse at the Business Service layer 74, enabling new applications to be built by reusing the key underlying business services.

Business service software applications are delivered to the client 43 through the application control layer 47 via the integration layer 51.

A business service software application may be defined as a reusable channel-independent, business-oriented, coarse-grained component that performs a specific business purpose, e.g. change address, create workflow object or provide contribution information.

Channel independent means that the business service software application can be invoked from multiple channels; built from a combination of business rules and logic and data services; need not perform any direct operational data access itself; may be built to meet a specific business need, not a specific graphical user interface (GUI) need; may operate across data access applications; reflect the business data or process (not user interface); and may contain business logic (e.g. calculations)

A Data Service is the component that physically accesses the underlying operational data. Data Services may be designed to be reusable components, depending on how the developing project wishes to structure its components. Reuse at this level is not of paramount importance as it is the business service layer that will typically provide interfaces to the data via published business functions.

The integration layer (REF) routes information between the channel dependent and channel independent layers of the present invention. The manner in which it operates will be described in detail below.

Figure 3:
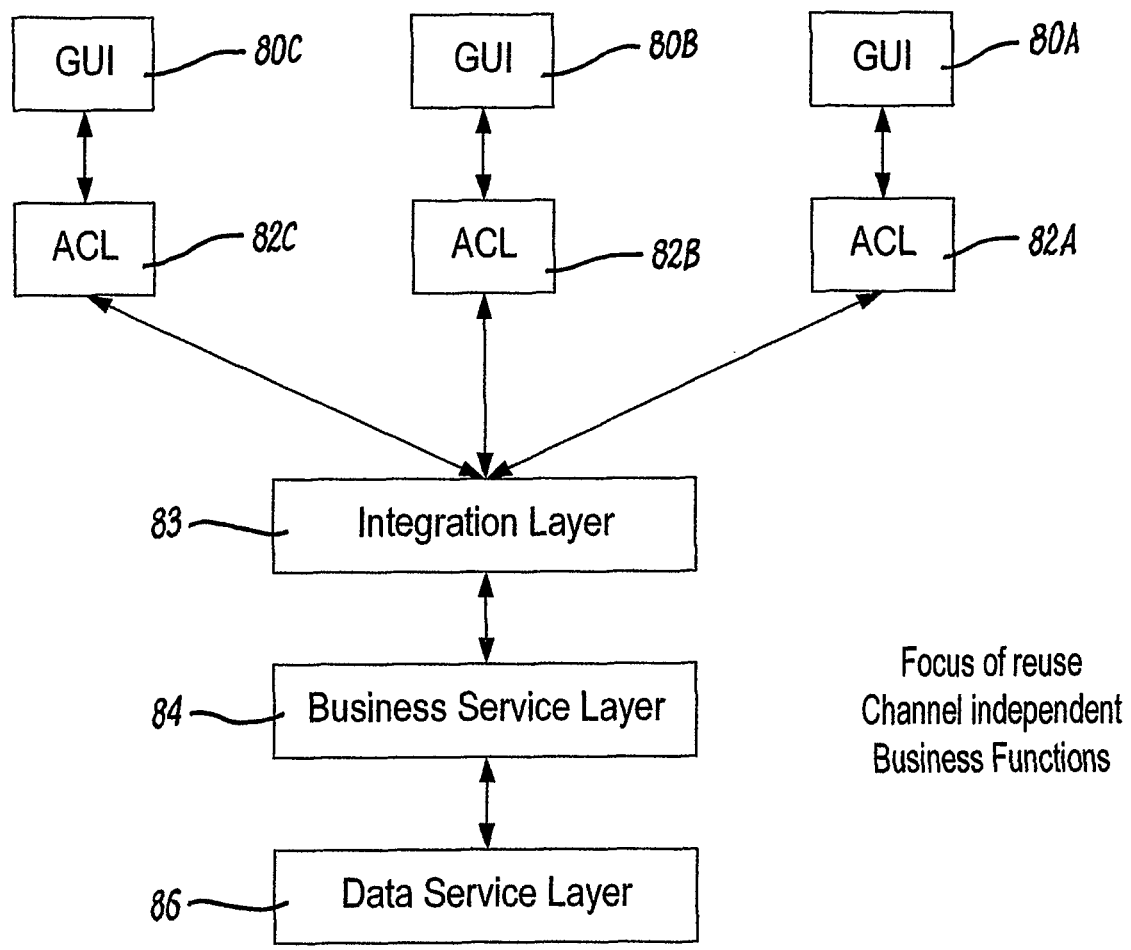
FIG. 3 is a block diagram showing the manner in which business services may be reused in an SOA in accordance with the present invention.

FIG. 3 shows a layered structure similar to that shown in FIG. 2 and shows the presentation layer (80A, 80B and 80C) and application control layer (82A, 82B and 82C) of three separate software applications or clients as also shown in FIG. 1. Each of the software applications or clients has different functionalities but use some common business services to implement their functionalities. The business service layer 84 and data service layer 86 are also shown.

In one example of the present invention, the following business services are defined.

ChangeAddress
ProvideCustomerInformation
GetSurrenderValue

These Business Services are channel independent and perform business functions that are designed to be reused in an 'off the shelf' manner.

Reuse requires an additional overhead when first defining the Business Services, to make sure the original requirement for processing meets the criteria for enabling reuse by others. Therefore the initial cost of developing applications is likely to be greater.

Whilst the cost of developing the SOA system of the present invention may be initially higher, the ability to reuse Business Services provides greater long term efficiency and lower cost. Therefore, if the small overhead is accepted and a Business Service created, future projects will benefit from the savings in time and resources because a large amount of functionality is already available. Over time, the increased reuse of services will reduce development costs.

Figure 4:
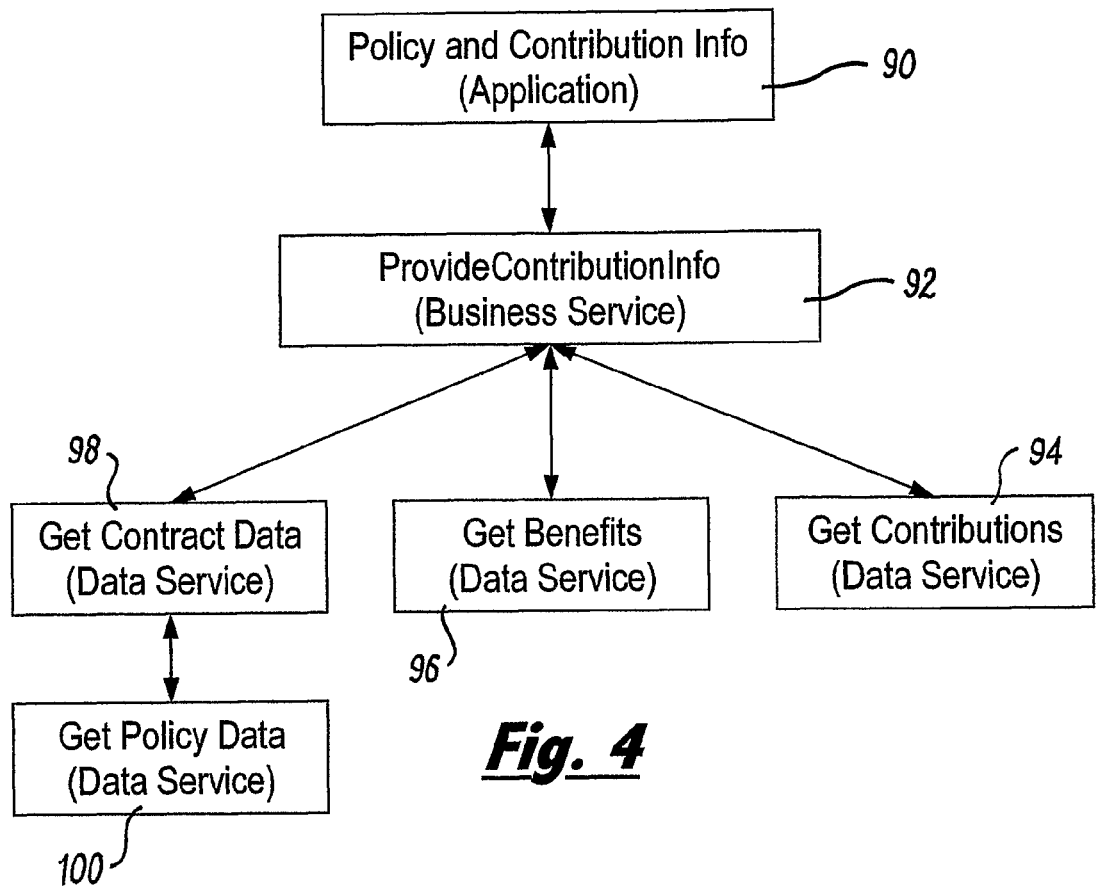
FIG. 4 is a block diagram showing the relationship between business services and data services in accordance with the present invention.

FIG. 4 shows the relationship between Business Services and Data Services. In this example, the software application or client relates to financial product policy and contribution information. A Business Service 92 called "Providecontributioninfo" links directly to three Data Services called "Get Contributions" 94 "Get Benefits" 96 and Contract Data" 98. The "Get Contract Data" Data Service 98 is itself linked to an additional Data Service called "Get Policy Data" 100.

The SOA of the present invention clearly differentiates between the Business Service layer and the Data Service layer. Business Services may be aggregations of Data Services—i.e. one Business Service is made up of many Data Services—and may act on data returned from many Data Services.

Figure 5:
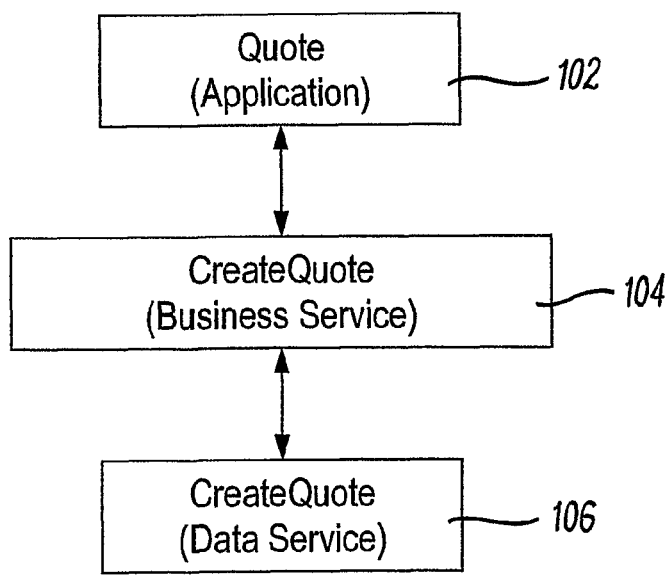
FIG. 5 shows a business service provided by a data service in accordance with the invention.

It is possible that an existing data service will provide a function which encompasses an entire business service as is illustrated in FIG. 5. In this example, CreateQuote 104 is an existing service which could be viewed as a business service. In this case a business service is written which wrappers the data service providing a channel independent, standardised business service interface to the data service.

It is expected that wrappering large Data Services in this way is only required for existing services. New services will be written as Business Services in the first instance.

Figure 6:
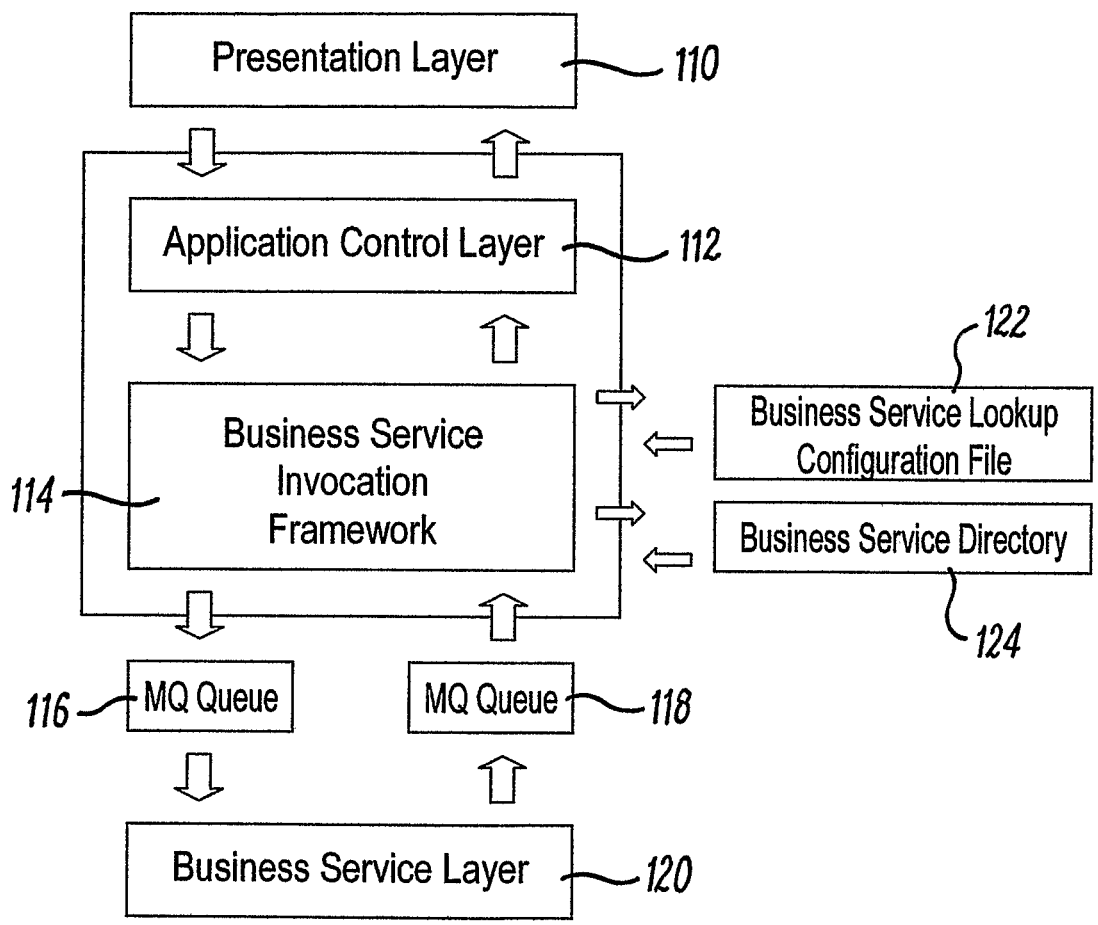
FIG. 6 is a flow diagram showing the operation of a system in accordance with the present invention.

An example of the operation of a system in accordance with the present invention is provided with reference to FIG. 6. FIG. 6 relates to the operation of the system by an end user.

The presentation layer 110 sends a request for data to the application control layer 112.

A requestID is generated, stored and is used to correlate all log messages related to this request.

The application control layer 112 decides which business services are required to satisfy the request. Requests to the services are passed to the business service invocation framework 114 of the integration layer.

At this point the invocation framework of the integration layer 114 only knows the logical business service name. The invocation framework uses that logical name as a key to access the Lookup Configuration File 122. This is an application specific resource that provides the enterprise-wide name and version of the business service to be used.

The Invocation Framework 114 can now use the business service name and version as a key to access the Business Service Directory 124. The Business Service Directory 124 provides further information about the business service; for example the message queue that may be used to address the service.

The message is made up of 3 parts: MQMD header, RFH2 header and the message payload. Attributes on the message will determine how it is handled e.g. a criticality setting on the business service will control whether the message is persisted to non-volatile storage (to guarantee delivery). A more detailed description of the message structure is provided below.

Once constructed, the message will be dispatched to the appropriate queue 116. The framework also supports stateful business services. In this case the routing mechanism must respect any affinity established by previous requests. This is supported through MQ Clustering and a bespoke cluster exit algorithm.

The invocation framework of the integration layer 114 has facilities to allow sophisticated message sending/receiving patterns e.g. blocking or non-blocking modes. The blocking mode is where the business service returns a response and the sender waits to receive the response. Non-blocking mode is where a sender invokes a business service but does not wish to receive a response.

Multiple requests can be sent in a single batch and acceptable response times can be configured statically or dynamically. Many messages can be sent before blocking on a receive. In this way the parallelism in the back-end server may be exploited.

The business service layer 120 reads the request message from the MQ queue 116 and runs the business service.

Business service framework code will be triggered by the arrival of a message on a queue and the requested service will be invoked. The reply message produced by the business service is sent to a reply MQ queue 118 specified by the invocation framework in the request.

The invocation framework 114 reads the reply message from the MQ queue 118 and returns the reply message to the application control layer 112.

The application control Layer 112 processes the business service reply(ies) and returns data ready to be rendered within the presentation layer 110.

Figure 7:
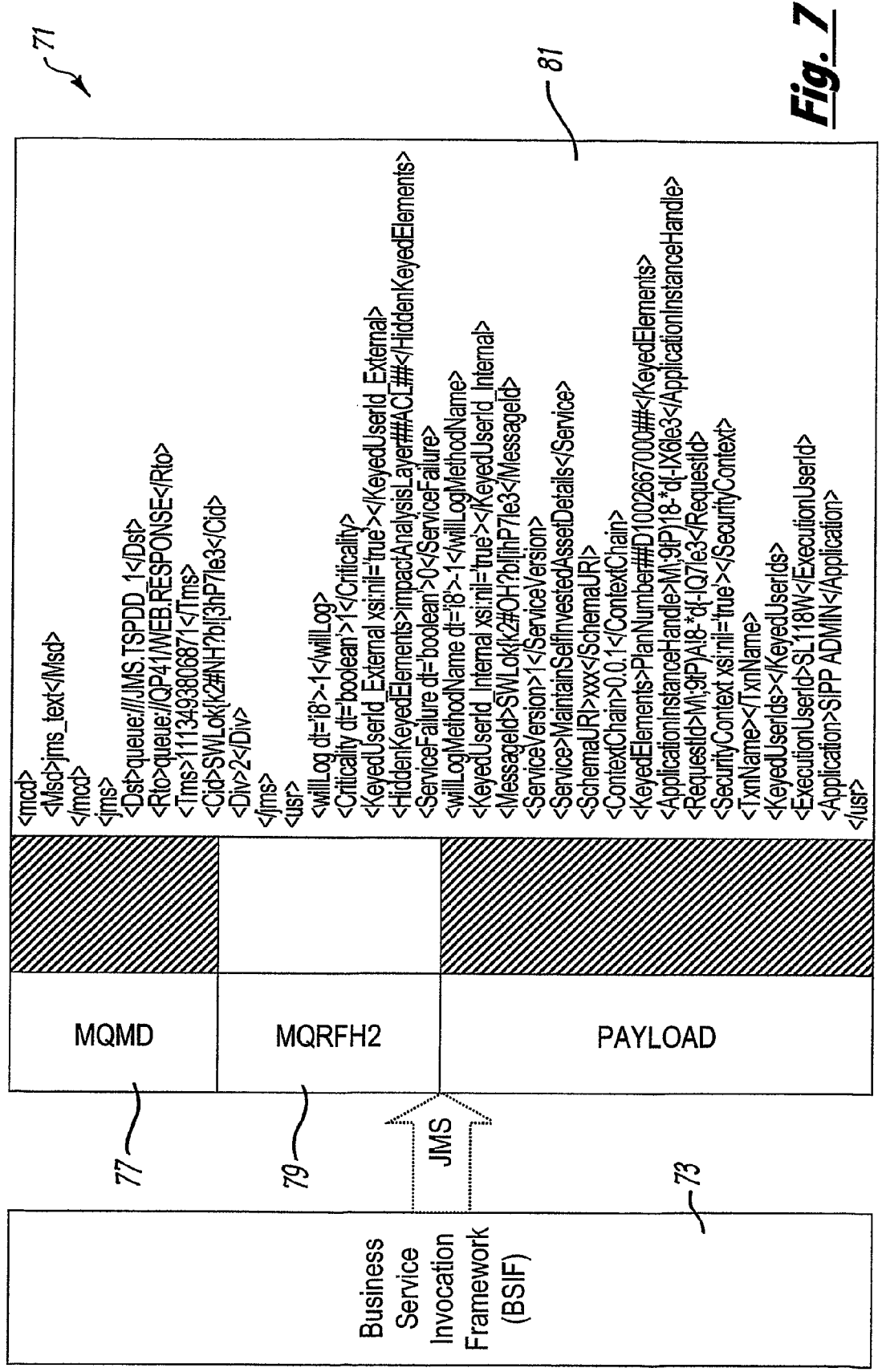
FIG. 7 is a schematic diagram showing the message structure used in the present invention.

FIG. 7 shows the message structure of messages created in the business service invocation framework of the integration layer. In this example, the message is in a format supported by Websphere MQ and has been produced using the Java Message Service (JMS) API. The headers within the message are used to enable contextual information to flow through the system. The message contains first and second headers 77 and 79. The first header 77 (known as MQMD header) is under Websphere MQ product control and is used to route the message. The second header 79 (known as RFH2 header) provides an area in which user defined information can flow with the business service request. This information in this header is populated under SOA framework control and its purpose is primarily to facilitate systems management functions.

The present invention provides a standard logging mechanism that can raise multiple events per request as the request is flowing through the tiers in the system. In addition the detection criteria for events can be tuned dynamically such that the logging volumes that are generated can be changed. This is useful as it allows detailed exploration and analysis of the system errors and system use.

Events may be correlated end-to-end across a heterogeneous system. Recordal of the logging event is highly flexible, dynamic and reconfigurable. The system provides a means for centralised aggregation and processing of logging events and the storage of these 2 logging events in a database to allow subsequent data 3 mining and analysis. In addition specific events can be configured to raise system management alerts.

Systems management information is generated at many points during the course of a normal end-to-end interaction.

Figure 11:
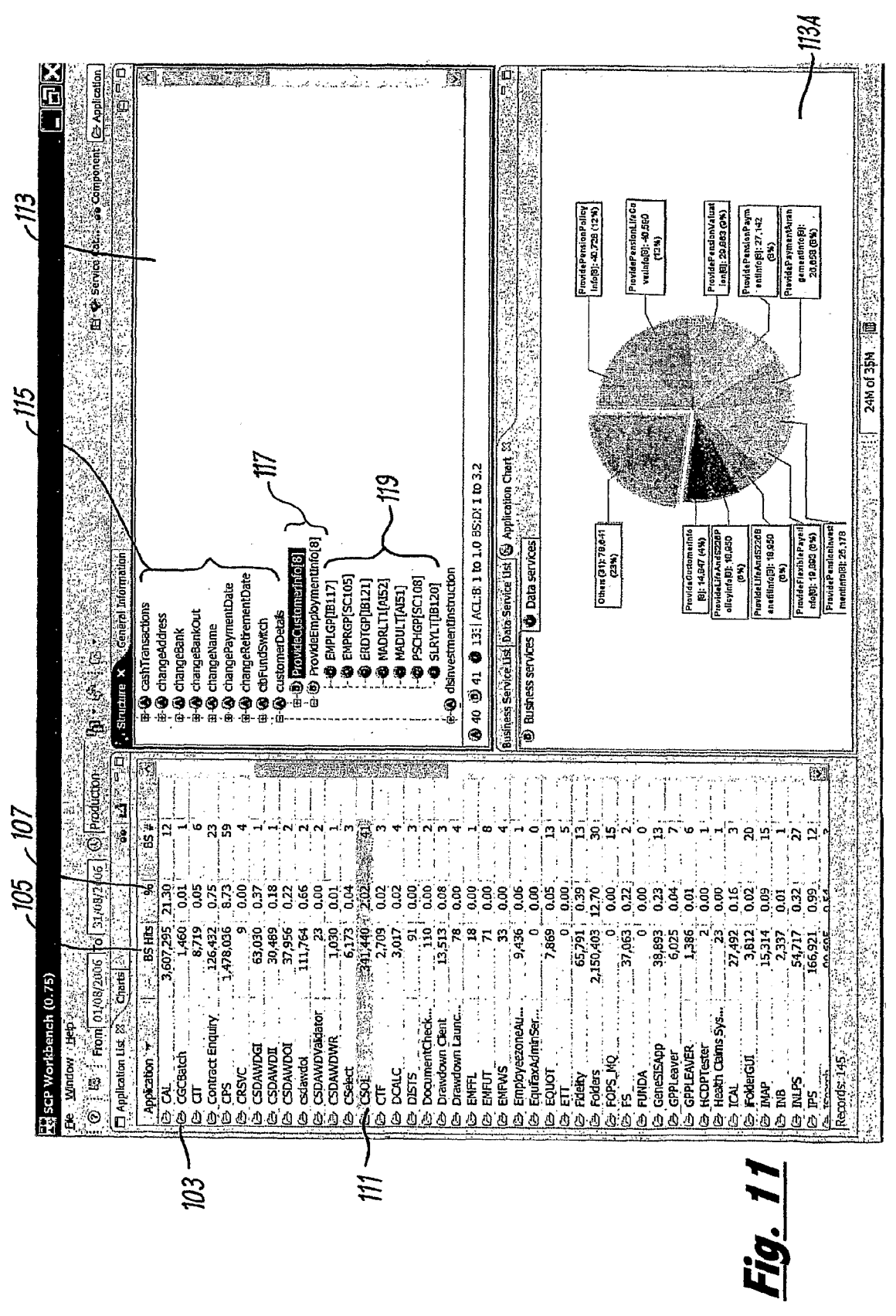

Four types of logging and associated events are explained below, these are:
1. General logging events
2. Audit and Management Information Events
3. Component Interaction events
4. Error and Systems management alerts An overview of the logging mechanism 130 for these 4 types is illustrated in FIG. 11. All events are raised via the SOA framework 132.

The component interaction events are sent to a component interaction mechanism 138 and then stored in a logging database 140. The other logging events 134 are sent to a logging mechanism 142 and subdivided into systems management alerts 144, general events 146 and application specific audit and management information 148A to 148C.

Various types of the general logging events are described in Table 1 along with an indication of the originator.

TABLE 1

| Type  | Subtype     | Description                                                                                                                                  | Originator           |
|-------|-------------|----------------------------------------------------------------------------------------------------------------------------------------------|----------------------|
| Debug | High        | General purpose event used to log any relevant information. Sub-Type "High" to be used for trace type information.                           | Application/Framework |
|       | Low         | Type "Low" to be used for general Debug information.                                                                                         |                      |
| Error | General     | General purpose error event                                                                                                                  | Application/Framework |
|       | Critical    | Failure event detailing critical component failure (Business Service failures)                                                               | Framework            |
|       | Framework   | General framework failure event                                                                                                              | Framework            |
| Info  | Roundtrip   | Time difference event This will be the end to end timing for a given request/ transaction from a user perspective                            | Framework            |
|       | Timestamp   | General purpose performance event                                                                                                            | Application/Framework |
|       | Initiation  | Event generated at component invocation                                                                                                      | Framework            |
|       | Termination | Event generated at component termination Together these 2 events allow us to monitor the time spent within a component                       | Framework            |
|       | Request     | Event generated when a component calls another component                                                                                     | Framework            |
|       | Reply       | Event generated when a reply is received Together these 2 events allow us to monitor the time spent waiting on the services of another component | Framework        |

Figure 9:
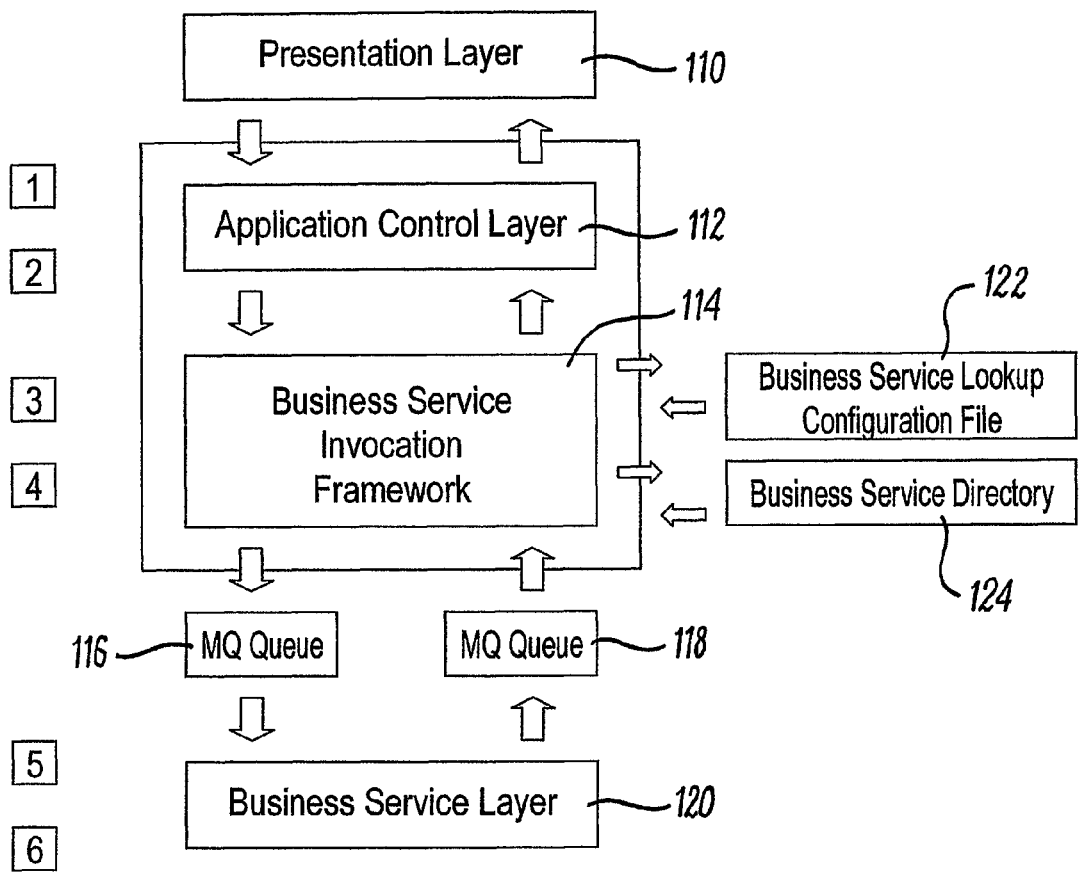
FIG. 9 shows logging events during a transaction undertaken using an SOA in accordance with the present invention.

Such events will typically be raised in two scenarios:
1. Under the control of application/service developers to create application specific debug information. This is most useful during application/service development, but can also be activated in production to expedite problem resolution.
2. Under the control of the SOA framework. Here events are logged at well-defined points of the request/transaction lifecycle. Further details are provided in FIG. 9.

Logs are be captured and held in a central database for subsequent querying by tools that form part of the invention. Typical uses for this log data are:
1. Application performance monitoring
2. Problem resolution both in development and production. The log information is of sufficient detail to allow issues with particular users, machines or business cases (policies, accounts etc) to be identified.
3. Volume/capacity monitoring. Provides information on absolute numbers along with throughput trends and concurrency information.
4. User statistics e.g. numbers of users of an application per day.

Tooling is provided for sophisticated analysis and visualisation of the data.

The volume of information recorded can be non-invasively stepped-up or stepped-down. Often in production systems, only Roundtrip information and Error events are recorded by default. It is however possible to configure the mechanism so that any number of event types (as described in Table 1) are recordable. This can also be fine-tuned to record data only for an arbitrary number of:
users
machines
applications
layers within an application A typical scenario here might be that you wish to resolve a system problem and would like to maximise the amount of runtime information you gather but you don't want to impact systems performance. In this case you could identify one or two representative users and step-up the logging just for them.

Additional facilities are provided for the gathering of application specific audit and management information.

This is not a universal facility; the SOA framework will not generate Audit/MI events other than in response to very specific application events. It is used where:
There is a requirement to capture data for legal purposes.
There is a requirement to capture application specific information that can be used for management reporting purposes.
There is a requirement to guarantee the creation of a log record.

Figure 8:
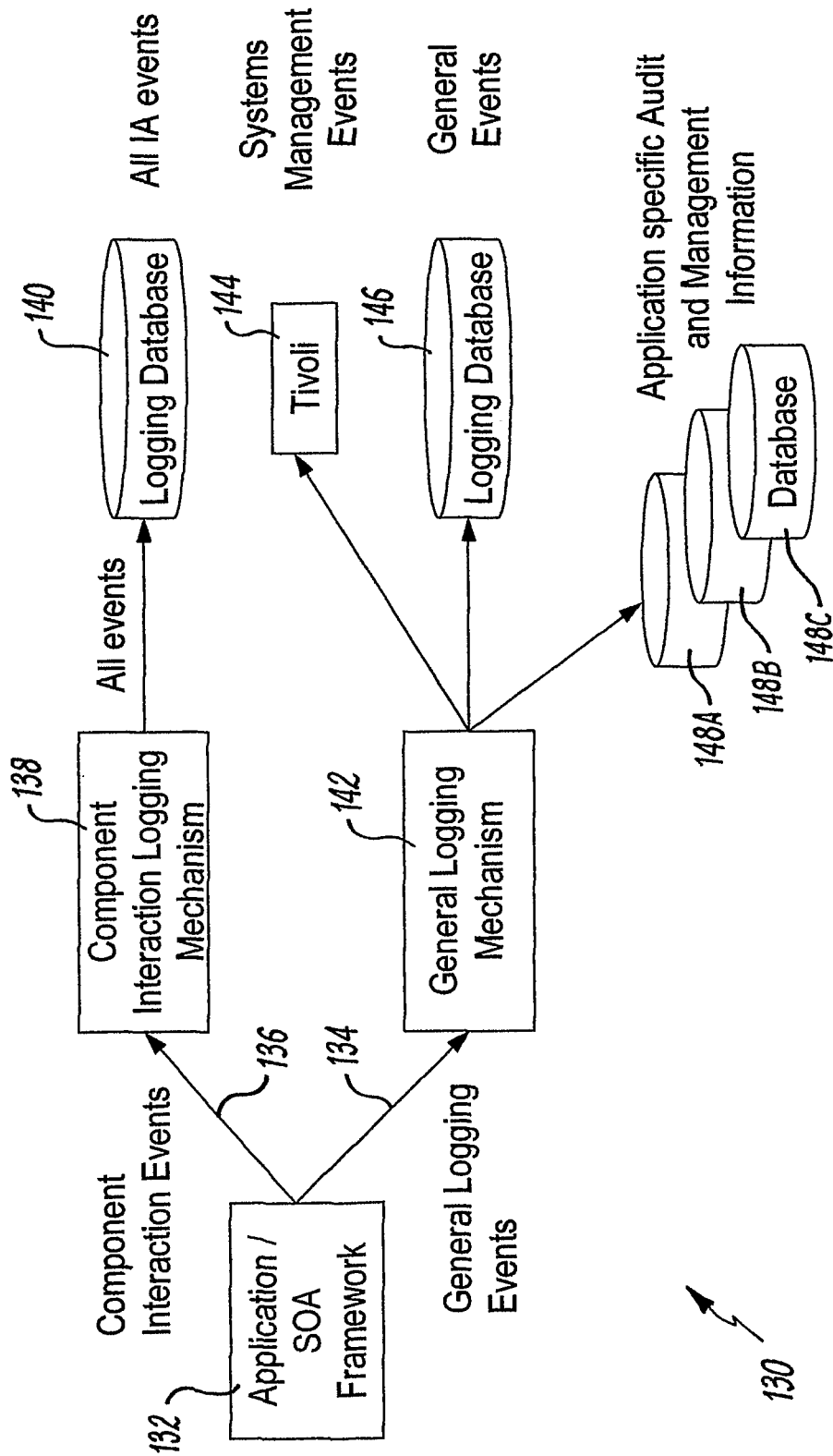
FIG. 8 shows an example of a logging mechanism in accordance with the present invention.

As illustrated in FIG. 8, Audit and MI records are written to separate, application/division specific databases. This is useful where there is a legal requirement to restrict access to data.

The uses for this information will be application specific.

The 'assured delivery' facilities of the underlying messaging product is used to guarantee delivery of the event The SOA framework generates component interaction events at defined points in the transaction/request lifecycle. As illustrated in FIG. 12, this captures the interaction between Application Control, Business Service and Data Service components. Information is captured regarding:
the network of component relationships
the level of usage of components The present invention includes query tools for the information designed to support:
Change planning—assessment of the impact of changes to shared components
Problem diagnosis
Capacity planning
Conformance to SOA standards Objective and automated measurement of the scale and value of reuse.

Errors occurring during a transaction lifecycle are handled by the standard logging mechanism. As illustrated in FIG. 8, this mechanism can interface with an organisation's systems management mechanism in order to raise systems management alerts. In this example, an interface to the IBM Tivoli Enterprise Console is provided.

Errors are handled in one of two ways depending on whether they have been anticipated or not. An anticipated error is one that has occurred due to circumstances foreseen by the application or framework developers. Anticipated errors are handled as follows:
1. An entry will be put to the Logging database.
2. The logging mechanism will check whether the error is one that requires systems management intervention. The decision will be based on meta-data agreed between the application owner and the operational function.
3. If intervention is required, an alert will be dispatched to the systems management solution.

Unanticipated errors will log to the logging database but when occurring in the Business Service layer will also have additional processing undertaken to determine whether systems management intervention is necessary. This will be the case if either of:
1. A Business Service has a Criticality flag configured to be true in the Business Service Directory.
2. A non-critical business service has exceeded a pre-determined threshold of failures in a given period. Again the number of failures and period is configured in the Business Service Directory.

Facilities are provided to allow priority information to be passed to the systems management mechanism.

Application owners typically monitor error events as a quality of service measurement. The provided tooling can also be used for browsing/analysing error information.

Figure 10:
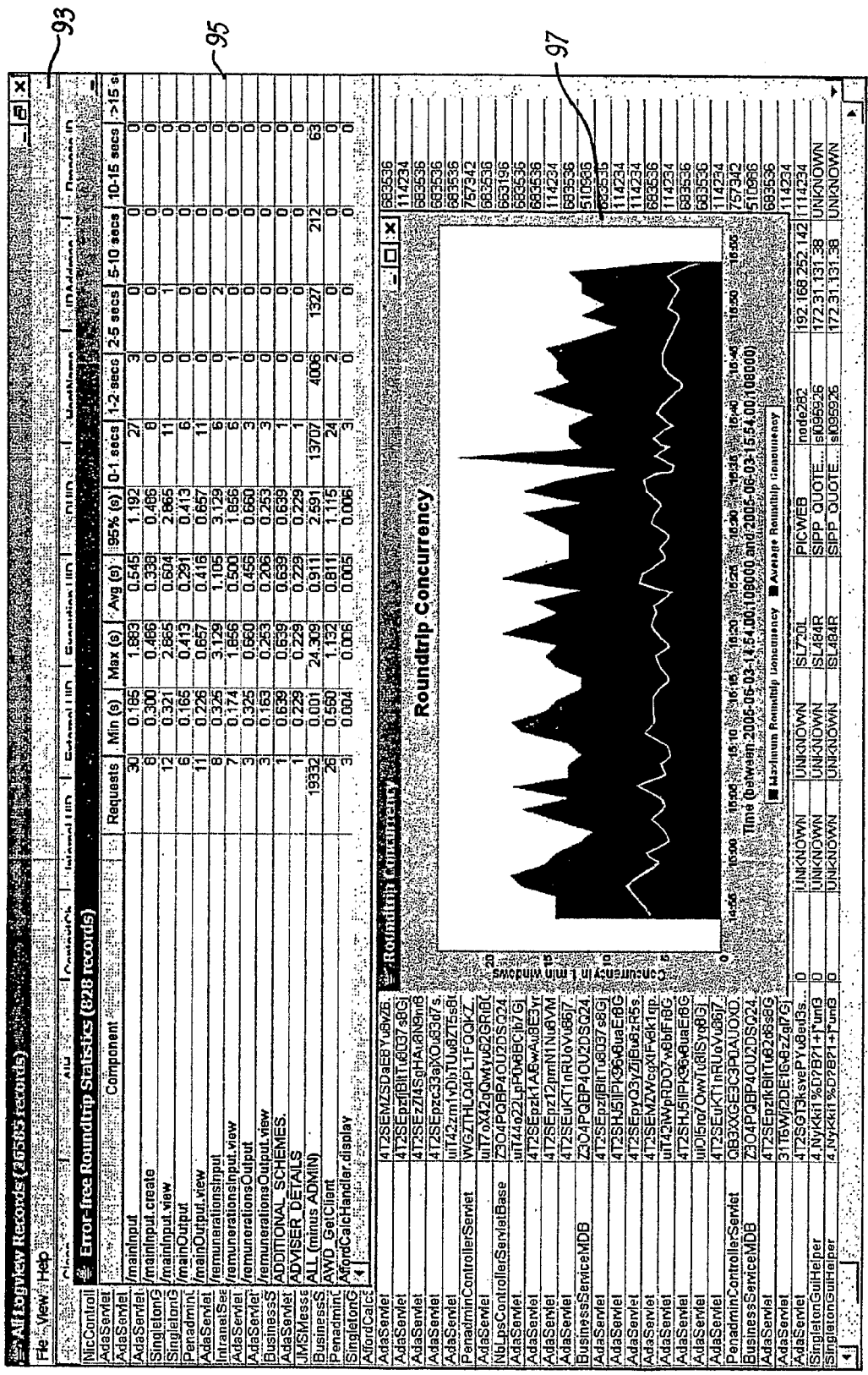
FIG. 10 shows a graphical user interface that displays logging information extracted from the system in accordance with the present invention.

FIG. 10 shows an example of the logging information that is available and the presentation of this information in graphical form.

FIG. 10 shows user interface 91 having three windows open 93, 95 and 97. Window 93 shows all logged records, window 95 shows error free round trip statistics and window 97 shows the round trip concurrency represented graphically.

This set of data is representative of the type of logging information that can be obtained using the present invention. The information that is presented graphically shows the average number of concurrent requests within the overall system over a given period and an illustration of a detailed breakdown of response times. The present invention provides a standardised component interaction logging.

The present invention allows a run time or substantially run time view of component interactions. This enables:
a holistic view of the sort of composite applications that are characteristic of an SOA.
fact-based decisions around impact analysis
more accurate resource planning
the gathering of re-use statistics that helps quantify the benefits of.

FIG. 11 shows a user interface from the provided datamining tool that allows the user to review and identify component interactions within the system. The left hand screen shows a number of Applications. Column 1 103 denotes the application name, column 2 105 indicates the number of hits on the application and column 3 107 the relative percentage of hits.

In this example, application CSOL 111 is highlighted. The top-half of the right hand screen 113 shows details of the highlighted CSOL application 111 and provides information on the structure of the CSOL application by showing the application control layer components 115 denoted with prefix A, the business services components 117 denoted with prefix B, and the data services components 119 denoted with prefix D.

The bottom-half of the right hand screen 113A graphically represents the usage of business services by the highlighted CSOL application.

Therefore the present invention provides a common framework that gives standardisation. It allows applications to be built and delivered in a consistent manner. In addition to the combination of framework plus tooling, interrogation of logging events can be correlated end to end across different platforms [as can the ability to interrogate component interaction information and support systems management]. You need to reword this, it doesn't make sense The manner in which software applications are designed in conformity with the SOA of the present invention are now described.

The application design phase commences and identifies at a high level requirements for business and data access logic (as well as presentation layer logic which will generally speaking, always have to be developed from scratch).

The Business Service Catalogue is consulted to determine whether existing business services fulfil any of the requirements. The Business Service Catalogue is a comprehensive list of services that have been developed and deployed as re-useable components. Each entry includes sufficient details on the service to help assess potential for reuse, and provide general information about the service.

For functionality not already available detailed analysis and design commences in order to identify business service composition and interfaces.

Build application. During the build phase a developer will typically be invoking a mix of already existing business services and new business services under development. Access to business services is controlled via the BSIF and its corresponding configuration.

Typically the development of an application involves a mix of build and reuse. In two example of the adoption of the SOA methodology, it was possible to reuse existing business services for 30 out of 35 and 12 out of 17 of their identified business service requirements.

Once a business service is being reused a dependency will exist between 2 or more client applications and the business service. The present invention supports a versioning model that enables new versions of business services to be introduced along side existing version(s).

When a new version is deployed it is deployed alongside the existing one. Client applications do not automatically pick up the new version; they have to be explicitly upgraded to do so. Generally client applications will only pick up a new version when they require the functionality required within. Processes need to be put in place restrict the number of versions that will run at the same time to a manageable number.

The ability to introduce change in a non-disruptive fashion is important in any large scale SOA. Client applications migrate to new versions as and when they require the additional functionality. If required bug fixes or legislative changes can be made to existing versions in-situ.

Improvements and modifications may be incorporated herein without deviating from the scope of the invention.

The invention claimed is:

1. A computer system having a service oriented architecture and which is adapted to run at least one channel dependent business service application, the computer system comprising:
   one or more channel dependent client layer upon which the channel dependent business service application will be run;
   one or more channel independent service layer which comprises a plurality of channel independent business services and a data services layer; and
   an integration layer comprising a business service invocation framework for receiving a request for service message from the at least one client layer, a message router adapted to send the request for service message to the at least one service layer which is adapted to read the request message and in response to build a channel dependent business service application to run on a channel dependent client layer;
   wherein the request is generated by a message generator and has a header that enables the routing of the message through the system;
   wherein the message has a context chain identifier that allows a position of the message within a chain of messages to be identified;
   wherein the system further comprises a system manager which comprises a logging mechanism for detecting and recording logging events associated with system activity; and
   wherein the logging mechanism is configurable so that different event types are logged; and
   wherein the integration layer is configured to map a name of a service onto a name and version of the business service and routes the message onto a queue.

2. A computer system as claimed in claim 1 wherein, the client layer comprises a presentation layer that is provided with processing means and logic for presenting information to end users.

3. A computer system as claimed in claim 2 wherein, the presentation layer is specific to the application and to the channel or platform which has been chosen to deliver the application to end users.

4. A computer system as claimed in claim 2 wherein, the presentation layer is able to selectively invoke components of an application control layer by sending a request for data to the application control layer.

5. A computer system as claimed in claim 1 wherein, the client layer comprises an application control layer.

6. A computer system as claimed in claim 5 wherein, the application control layer is configured to act as a controlling component for business services in a business services layer.

7. A computer system as claimed in claim 6 wherein the application control layer is configured to determine which business services are required to satisfy the request for service.

8. A computer system as claimed in claim 1 wherein, the service layer is provided with a business service layer.

9. A computer system as claimed in claim 8 wherein, the business services layer is adapted to provide generic business functions.

10. A computer system as claimed in claim 8 wherein, the business service layer is adapted to read the request message from a message queue and in response, to run the business service application.

11. A computer system as claimed in claim 1 wherein, end-to-end processing of the request for service from the client layer is split across the client layer and the service layer.

12. A computer system as claimed in claim 1 wherein, the integration layer is configured to use a business service name and version as a key to access a business service directory.

13. A computer system as claimed in claim 1 wherein, the integration layer further comprises a message queue.

14. A computer system as claimed in claim 1 wherein, the arrival of the request message in a message queue triggers a business service framework code which invokes the requested service.

15. A computer system as claimed in claim 14 wherein, a reply message is produced by the business service layer and is sent to a reply message queue.

16. A computer system as claimed in claim 15 wherein, the reply message queue to which the reply message is sent is specified in the request message.

17. A computer system as claimed in claim 15 wherein, an application control Layer is configured to process the business service reply message and returns data ready to be rendered within the Presentation Layer.

18. A computer system as claimed in claim 1 wherein, the message header is configured to enable user and system defined contextual information to flow through the system.

19. A computer system as claimed in claim 1 wherein, the message header is configured to provide the message with a unique identifier that allows information about the message to flow across logic controls.

20. A computer system as claimed in claim 1 wherein, the message has a session ID which provides information on a user session within which the message was executed.

21. A computer system as claimed in claim 1 wherein, the message has a payload which contains request data.

22. A computer system as claimed in claim 21 wherein, the request data comprises input parameters that are passed to the business service.

23. A computer system as claimed in claim 1 wherein, the logging mechanism is configured to emit one or more events per request message as the request message is flowing through the layers in the system.

24. A computer system as claimed in claim 23 wherein the emission of events can be scaled up or scaled down dynamically such that logging volumes that are generated can be changed.

25. A computer system as claimed in claim 1 wherein the logging events are captured and held in a central database for subsequent querying.

26. A computer system as claimed in claim 1 wherein, the logging mechanism is provided with an analysis tool for analysing logging data.

27. A computer system as claimed in claim 26 wherein the analysis tool is configured to use a graphical user interface which presents one or more different event type.

28. A computer system as claimed in claim 27 wherein event type data comprises an average number of concurrent requests within the system.

29. A computer system as claimed in claim 27 wherein event type data comprises response time data.

30. A computer system as claimed in claim 1 wherein, the logging mechanism is configured to gather event types including application specific audit and management information.

31. A computer system as claimed in claim 1 wherein at least one event type is displayed in a separate window from another event type.

32. A method for operating a service oriented architecture, the method comprising the steps of:

sending a request for service message to an integration layer from at least one channel dependent client layer, the integration layer comprising a business service invocation framework;

routing the request for service message through the integration layer to at least one service layer which comprises a plurality of channel independent business services and data services and which is adapted to read the request message and in response, to build a channel dependent business service application to run on the channel dependent client layer;

wherein the request message is generated by a message generator and has a header that enables the routing of the message through a system;

wherein the message has a context chain identifier that allows a position of the message within a chain of messages to be identified;

wherein the system further comprises a system manager which comprises a logging mechanism for detecting and recording logging events associate with system activity;

wherein the logging mechanism is configurable so that different event types are logged; and wherein the integration layer is configured to map a name of a service onto a name and version of the business service and routes the message onto a queue.

* * * * *